(12) United States Patent
Chen (10) Patent No.: US 10,480,921 B2
(45) Date of Patent: Nov. 19, 2019

(54) COUNTING DEVICE OF DISTANCE MEASURING WHEEL

(71) Applicant: Ching-Yuan Chen, Taichung (TW)

(72) Inventor: Ching-Yuan Chen, Taichung (TW)

( * ) Notice: Subject to any disclaimer, the term of this patent is extended or adjusted under 35 U.S.C. 154(b) by 0 days.

(21) Appl. No.: 16/056,530

(22) Filed: Aug. 7, 2018

(65) Prior Publication Data

US 2018/0340761 A1 Nov. 29, 2018

(51) Int. Cl.
*G06C 27/00* (2006.01)
*G01B 3/12* (2006.01)
*G06M 1/08* (2006.01)

(52) U.S. Cl.
CPC .............. *G01B 3/12* (2013.01); *G06M 1/083* (2013.01)

(58) Field of Classification Search
CPC ......... G06M 1/083; G06M 1/062; G06M 1/27
USPC ......................................... 235/103, 106, 107
See application file for complete search history.

(56) References Cited

U.S. PATENT DOCUMENTS

| 3,935,996 | A | * | 2/1976 | Kleinbohl | G06M 3/021 235/95 R |
| 4,114,025 | A | * | 9/1978 | Carol, Jr. | G01C 22/00 116/62.4 |
| 5,304,785 | A | * | 4/1994 | Ohike | B60K 35/00 235/95 R |
| 6,859,510 | B1 | * | 2/2005 | Ishida | G06M 1/22 235/1 B |

* cited by examiner

*Primary Examiner* — Daniel St Cyr
(74) *Attorney, Agent, or Firm* — Chun-Ming Shih; LanWay IPR Services (57) ABSTRACT

A counting device for distance measuring wheel includes a housing, a transmission assembly, a counter wheel assembly, and a reset control assembly. An elastic support unit of the reset control assembly is arranged at the side of each of the transmission assembly and the counter wheel assembly so that the relative positions among the transmission assembly, the counter wheel assembly, and the reset control assembly arranged inside the housing are changed and the size of the counter wheel assembly may become larger while the size of the housing is not changed.

5 Claims, 8 Drawing Sheets

COUNTING DEVICE OF DISTANCE MEASURING WHEEL

FIELD OF THE INVENTION

The present invention relates to a counter, and more particularly to a counting device for distance measuring wheel.

BACKGROUND OF THE INVENTION

The distance measuring wheel is a tool for measuring the distance by rotating the wheel. Generally, it is applied for road construction or traffic accidents.

The distance measuring wheel includes a rod-like frame, a wheel body, and a counting device. The wheel body is picoted to the rod-like frame. The wheel body is linked to the counter wheels arranged in the counting device. It is then converted to the distance of the wheel body rotating on the road.

Figure 1:
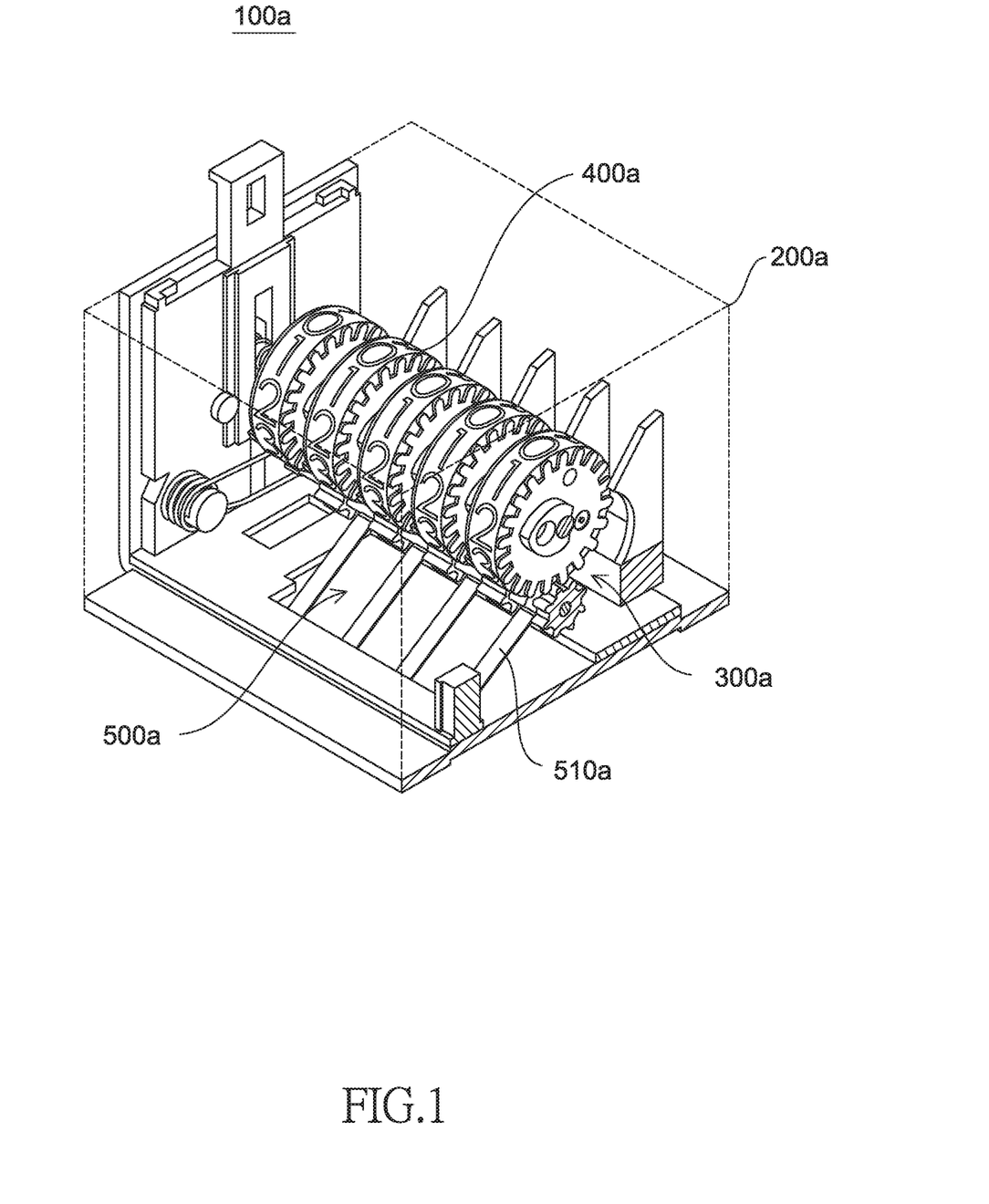
FIG. 1 is a conventional counting device for distance measuring wheel.

The conventional counting device is shown as in FIG. 1. The conventional counting device 100a comprises a housing 200a, a transmission assembly 300a, a counter wheel assembly 400a, and a reset control assembly 500a. The housing 200a is a cuboid. The transmission assembly 300a, the counter wheel assembly 400a, and the reset control assembly 500a are arranged inside the housing 100a. An elastic support unit 510a of the reset control assembly 500a is disposed below the transmission assembly 300a and the counter wheel assembly 400a. Therefore, the arrangement of the elastic support unit 510a may make the elastic support unit 510a made of plastic materials result in fatigue after long-term use.

Besides, because the receiving space of the rod-like frame is limited and the counting device must abut against the wheel, the arrangement of the elements received inside the conventional counting device is limited by the cuboid housing. It results in that the size of the counter wheel assembly become smaller and further the numbers displayed on the counting device are hard to be seen by users.

In view of the foregoing circumstances, the inventor has invested a lot of time to study the relevant knowledge, compare the pros and cons, research and develop related products. After quite many experiments and tests, the "counting device for distance measuring wheel" of this invention is eventually launched to improve the foregoing shortcomings, to meet the public use.

SUMMARY OF THE INVENTION

An object of this invention is provided a counting device for distance measuring wheel. The relative positions among the transmission assembly, the counter wheel assembly, and the reset control assembly arranged inside the housing are changed so that the size of the counter wheel assembly may become larger while the size of the housing is not changed. Furthermore, the elastic support unit of the reset control assembly is detachably arranged so that the elastic support unit may be replaced after long-term use and fatigue.

A counting device for distance measuring wheel comprises a housing, having a top surface, a bottom surface, two side surfaces, a resetting surface, and a linking surface, the top surface has a measuring window, the bottom surface is corresponding to and parallel to the top surface, the two side surfaces are respectively connected to two sides of each of the top surface and the bottom surface, the resetting surface is connected with the top surface, the bottom surface, and the two side surfaces, the resetting surface has a fixing hole, a notch, and a first sliding slot, the notch is arranged toward the top surface, the first sliding slot is arranged toward one of the two side surfaces, the linking surface is opposite to the resetting surface and connected to the top surface, the bottom surface, and the two side surfaces, the linking surface has a through hole and a second sliding slot, the second sliding slot is corresponding to the first sliding slot; a transmission assembly, having a first shaft, a driving wheel, a second shaft, and a plurality of transmission wheels, the first shaft is arranged in the through hole of the linking surface and the fixing hole of the resetting surface, one end of the first shaft is protruded from the through hole, the driving wheel is fastened to the first shaft and rotated with the first shaft, the second shaft is elastically reset and slidably arranged in the first sliding slot of the resetting surface and the second sliding slot of the linking surface, the transmission wheels are respectively pivoted on the second shaft, and one of the transmission wheels is engaged with the driving wheel; a counter wheel assembly, disposed in the housing and toward the measuring window, the counter wheel assembly has a plurality of counter wheels, the counter wheels are respectively pivoted on the first shaft, and each of the counter wheels is engaged with each of the transmission wheel; and a reset control assembly, having an elastic support unit, a push unit, and a dial unit, the elastic support unit is arranged at one of the two side surfaces and supports the second shaft, the push unit is movably arranged at the notch of the resetting surface and abutted against the second shaft, and the dial unit is arranged on the second shaft.

In some embodiment, each of the linking surface and the resetting surface has two long sides and two short sides, the two long sides are respectively connected to the top surface and the bottom surface, and the two short sides are respectively connected to the two side surfaces.

In some embodiment, the resetting surface further includes a first scarfing slot, the linking surface further includes a second scarfing slot, the elastic support unit of the reset control assembly is detachably arranged at the first scarfing slot and the second scarfing slot.

In some embodiment, the push unit has an inclined surface, and the inclined surface pushes the second shaft.

In some embodiment, the top surface and the two side surfaces are made of transparent materials.

Therefore, the relative positions among the transmission assembly, the counter wheel assembly, and the reset control assembly arranged inside the housing are changed so that the elastic support unit of the reset control assembly is arranged at one of the two side surfaces of the housing, but not at the bottom surface of the housing. It results in that the transmission assembly, the counter wheel assembly, and the elastic support unit are arranged parallel to each other along the long side of each of the linking surface and the resetting surface. So, the size of the counter wheel assembly may become larger while the size of the size of the housing is not changed. Furthermore, the elastic support unit of the reset control assembly is detachably arranged at the first scarfing slot of the resetting surface and the second scarfing slot of the linking surface so that the elastic support unit may be replaced after long-term use and fatigue.

Further features and advantages of the present invention will become apparent to those of skill in the art in view of the detailed description of preferred embodiments which follows, when considered together with the attached drawings and claims.

BRIEF DESCRIPTION OF THE DRAWINGS

All the objects, advantages, and novel features of the invention will become more apparent from the following detailed descriptions when taken in conjunction with the accompanying drawings.

DESCRIPTION OF THE PREFERRED EMBODIMENT

Referring now to the drawings where like characteristics and features among the various figures are denoted by like reference characters.

Figure 2:
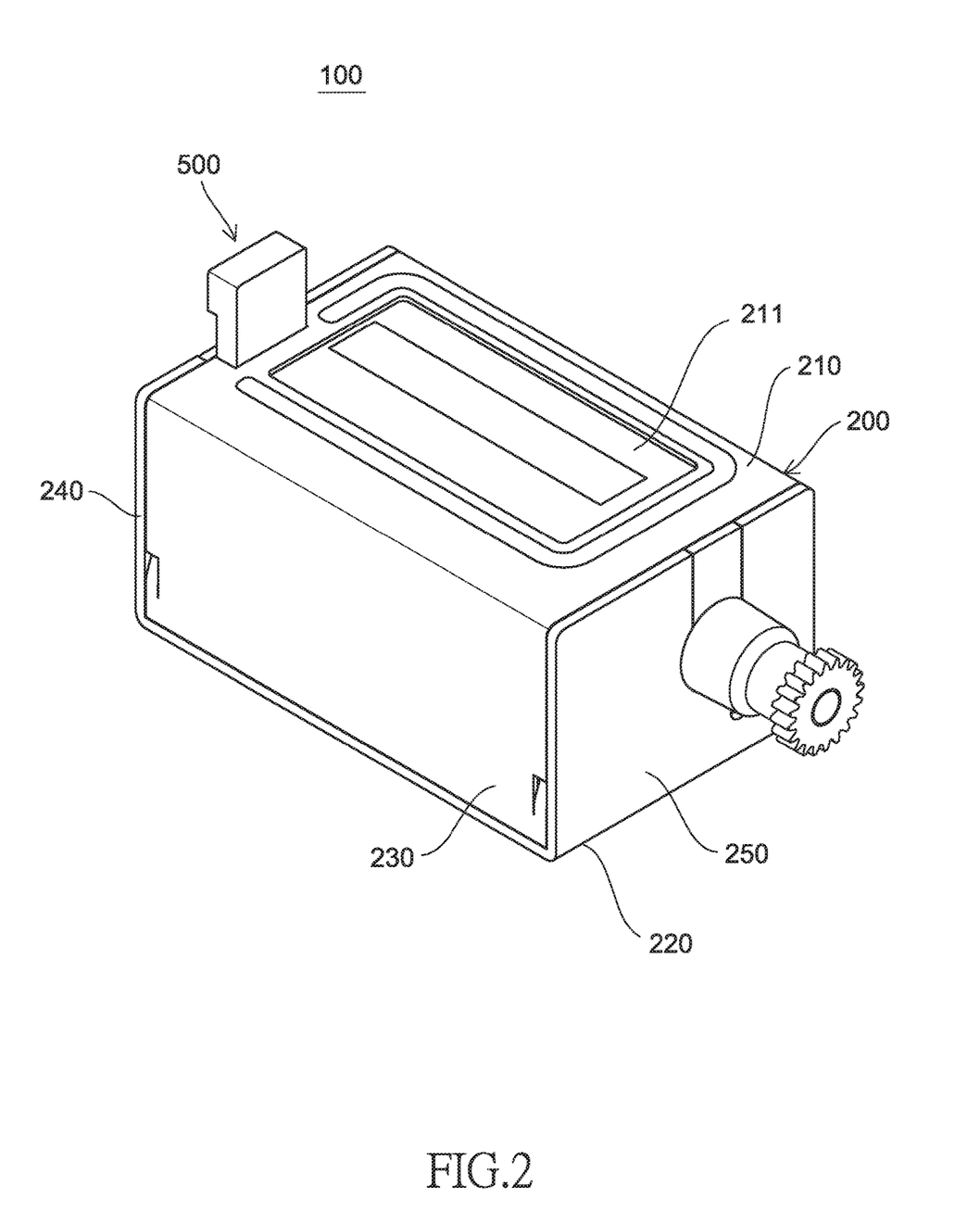
FIG. 2 is a perspective view of a counting device for distance measuring wheel of the present invention.
Figure 3:
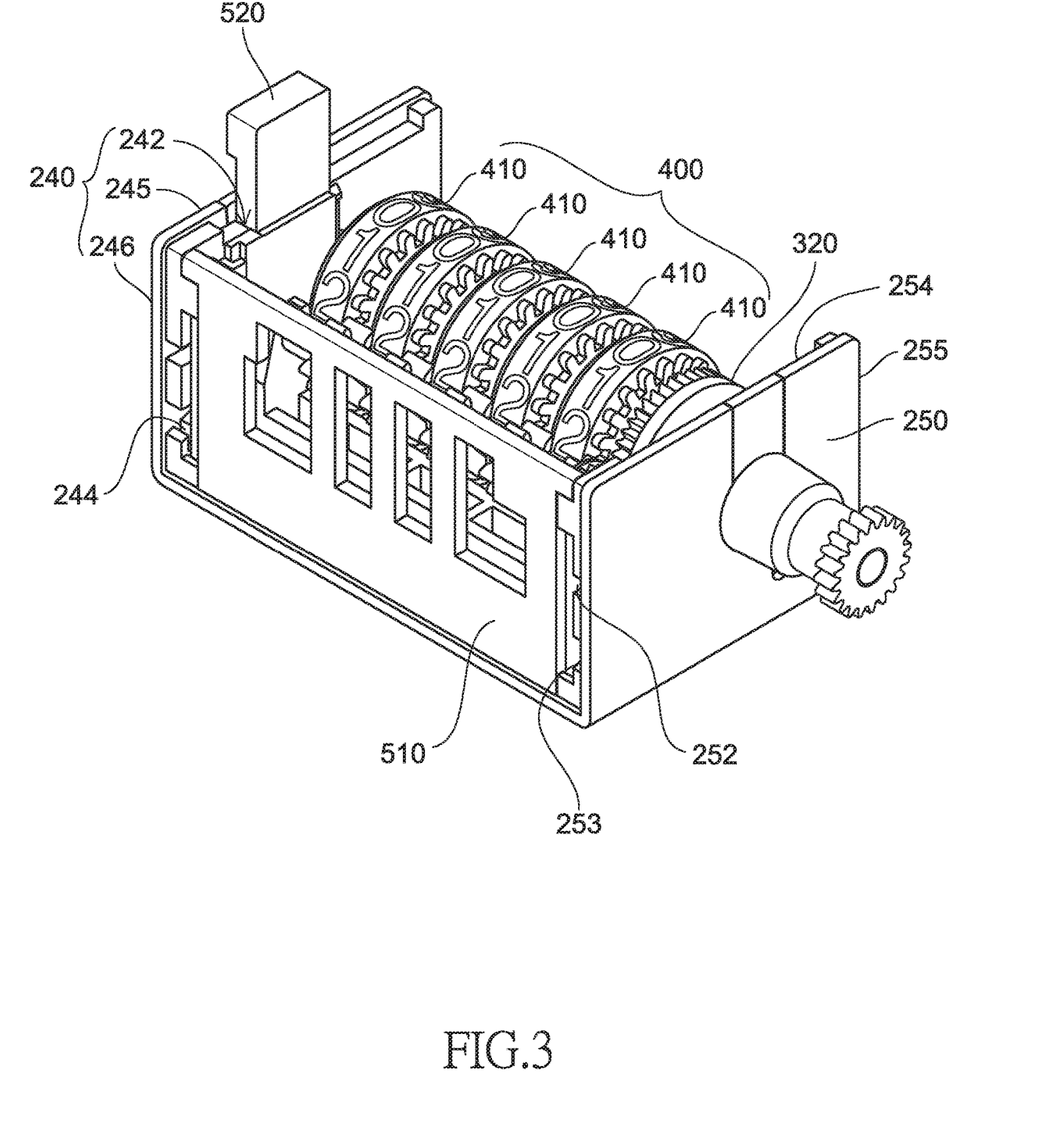
FIG. 3 is a perspective view of a housing, a transmission assembly, a counter wheel assembly, and a reset control assembly of the counting device in FIG. 2.
Figure 4:
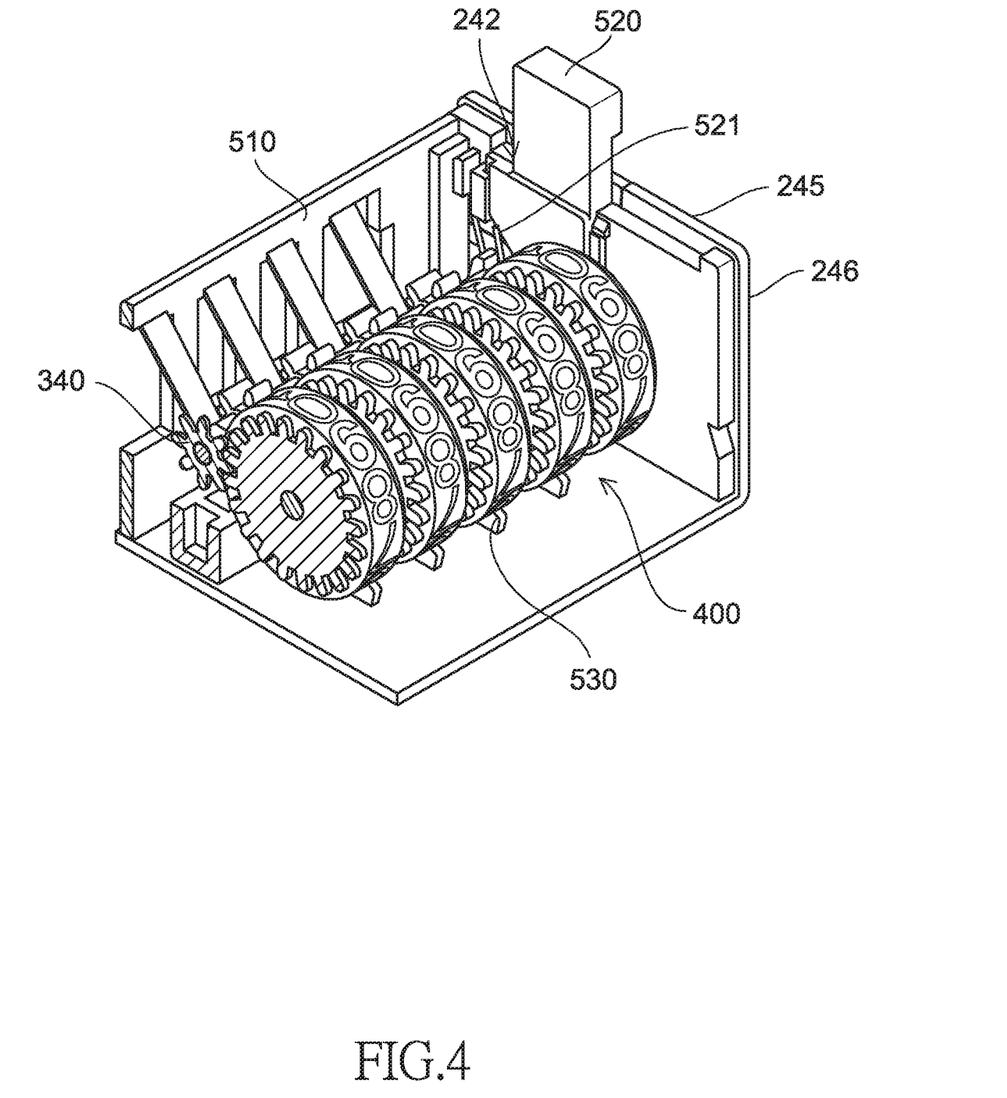
FIG. 4 is another perspective view of the housing, the transmission assembly, the counter wheel assembly, and the reset control assembly of the counting device in FIG. 2.
Figure 5:
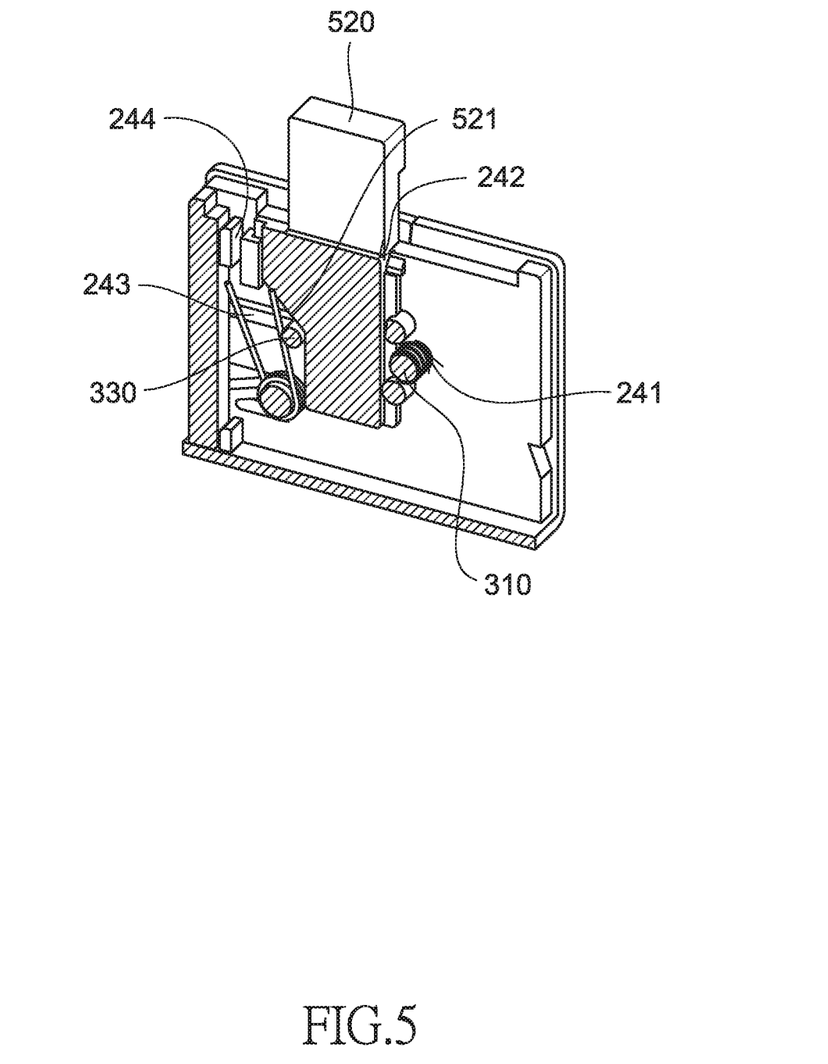
FIG. 5 is a perspective view of the counting device in FIG. 2 while the push unit is abutted against the second shaft.

Please refer to FIGS. 2 to 5. FIG. 2 is a perspective view of one embodiment of a counting device 100 for distance measuring wheel of the present invention. FIG. 3 is a perspective view of a housing 200, a transmission assembly 300, a counter wheel assembly 400, and a reset control assembly 500 of the counting device 100 in FIG. 2. FIG. 4 is another perspective view of the housing 200, the transmission assembly 300, the counter wheel assembly 400, and the reset control assembly 500 of the counting device 100 in FIG. 2. FIG. 5 is a perspective view of the counting device 100 in FIG. 2 while the push unit 520 is abutted against the second shaft 330.

The counting device 100 for distance measuring wheel comprises the housing 200, the transmission assembly 300, the counter wheel assembly 400, and the reset control assembly 500.

The housing 200 has a top surface 210, a bottom surface 220, two side surfaces 230, a resetting surface 240, and a linking surface 250. The top surface 210 has a measuring window 211. The bottom surface 200 is corresponding to and parallel to the top surface 210. The two side surfaces 230 are respectively connected to two sides of each of the top surface 210 and the bottom surface 220. The resetting surface 240 is connected with the top surface 210, the bottom surface 220, and the two side surfaces 230. The resetting surface 240 has a fixing hole 241, a notch 242, and a first sliding slot 243. The notch 242 is arranged toward the top surface 210. The first sliding slot 243 is arranged toward one of the two side surfaces 230. The linking surface 250 is opposite to the resetting surface 240 and connected to the top surface 210, the bottom surface 220, and the two side surfaces 230. The linking surface 250 has a through hole 251 and a second sliding slot 252. The second sliding slot 252 is corresponding to the first sliding slot 243. Each of the linking surface 250 and the resetting surface 240 has two long sides 254, 245 and two short sides 255, 246. The two long sides 254, 245 are respectively connected to the top surface 210 and the bottom surface 220, and the two short sides 255, 246 are respectively connected to the two side surfaces 230.

The transmission assembly 300 has a first shaft 310, a driving wheel 320, a second shaft 330, and a plurality of transmission wheels 340. The first shaft 310 is arranged in the through hole 251 of the linking surface 250 and the fixing hole 241 of the resetting surface 240. One end of the first shaft 310 is protruded from the through hole 251. The driving wheel 320 is fastened to the first wheel 310 and rotated with the first shaft 310. The second shaft 330 is elastically reset and slidably arranged in the first sliding slot 243 of the resetting surface 240 and the second sliding slot 252 of the linking surface 250. The transmission wheels 340 are respectively pivoted on the second shaft 330. One of the transmission wheels 340 is engaged with the driving wheel 320.

The counter wheel assembly 400 is disposed in the housing 200 and toward the measuring window 211. The counter wheel assembly 400 has a plurality of counter wheels 410. The counter wheels 410 are respectively pivoted on the first shaft 310. Each of the counter wheels 410 is engaged with each of the transmission wheel 340.

The reset control assembly 500 has an elastic support unit 510, a push unit 520, and a dial unit 530. The elastic support unit 510 is arranged at one of the two side surfaces 230 and supports the second shaft 330. The push unit 520 is movably arranged at the notch 242 of the resetting surface 240 and abutted against the second shaft 330. In FIG. 5, the push unit 520 has an inclined surface 521 which is used for pushing the second shaft 330. The dial unit 530 is arranged on the second shaft 330.

In the prior art, the transmission assembly 300 and the counter wheel assembly 400 are engaged with each other. And also how to use the reset control assembly 500 to reset the counter wheel assembly 400 is prior art. The detail descriptions are omitted.

In particular, the size of the housing 200 illustrated in FIG. 2 is the same as the one of the housing 200a illustrated in FIG. 1. The position of the elastic support unit 510a which is originally arranged below the transmission assembly 300a and the counter wheel assembly 400a in FIG. 1 is changed to become one embodiment of the present invention. In detail, the elastic support unit 510 of the embodiment of the present invention is arranged at the side of each of the transmission assembly 300 and the counter wheel assembly 400 so that the transmission assembly 300, the counter wheel assembly 400, and the elastic support unit 510 are arranged parallel to each other and along the two long sides 254, 145 of each of the linking surface 250 and the resetting surface 240. Therefore, compared to FIG. 1, the relative positions among the elastic support unit 510, the transmission assembly 300, and the counter wheel assembly 400 may make the receiving space formed in the housing 200 much wider and further the size of the counter wheel assembly 410 may become larger. It is convenient for the user to see. In addition, since the elastic support unit 510 is arranged at the side of each of the transmission assembly 300 and the counter wheel assembly 400, the fatigue problem of the elastic support unit 510a in FIG. 1 after long-term use will not be happened.

Figure 6:
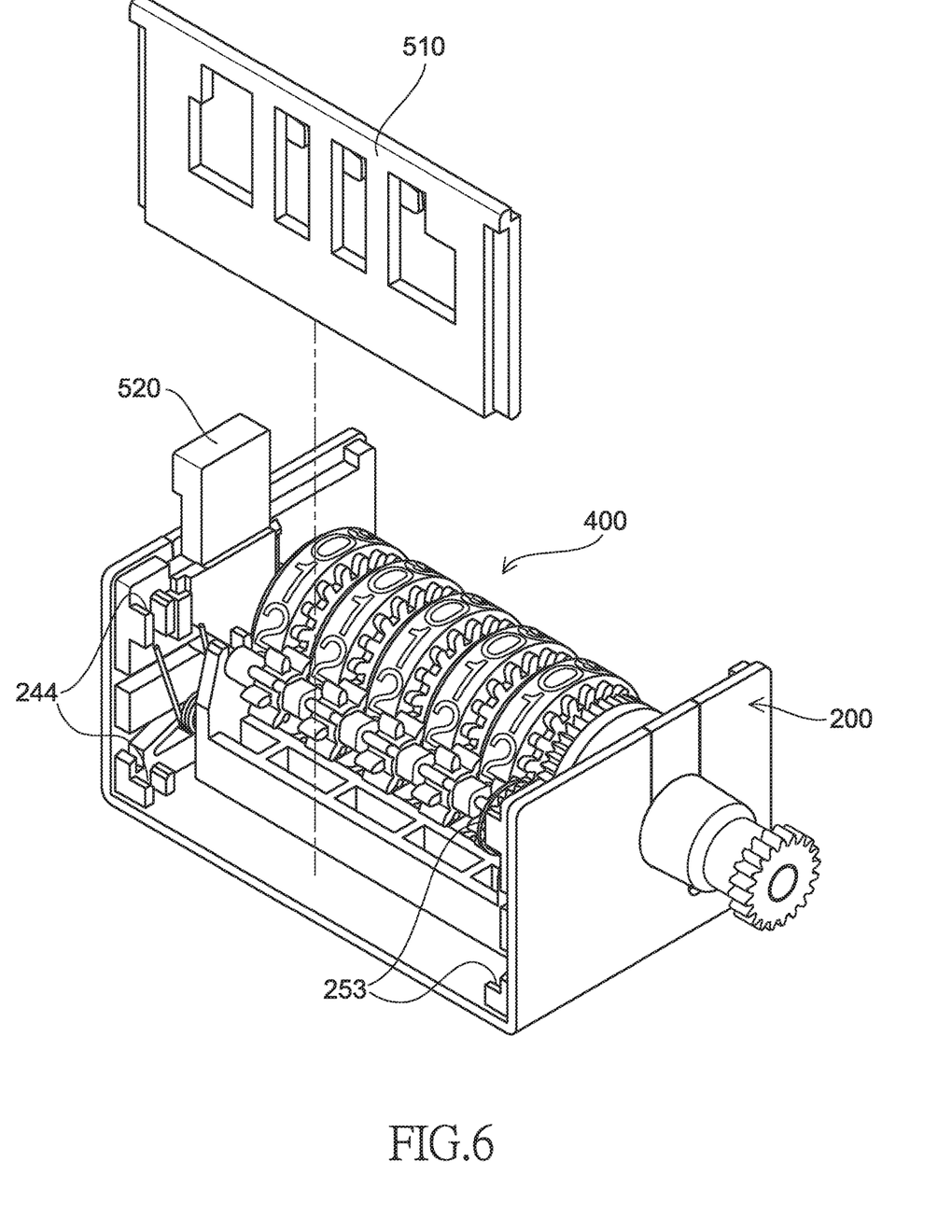
FIG. 6 is a perspective view of the counting device in FIG. 2 while the elastic support unit is arranged at the first scaring slot and the second scarfing slot.

Please refer to FIG. 6, it shows a perspective view of the counting device 100 in FIG. 2 while the elastic support unit 510 is arranged at the first scaring slot 244 and the second scarfing slot 253. In FIG. 6, the resetting surface 240 further includes a first scarfing slot 244 and the linking surface 250 further includes a second scarfing slot 253 so that the elastic support unit 510 of the reset control assembly 500 is detachably arranged at the first scarfing slot 244 and the second scarfing slot 253 to achieve the advantage of replacing the elements at any time.

Figure 7:
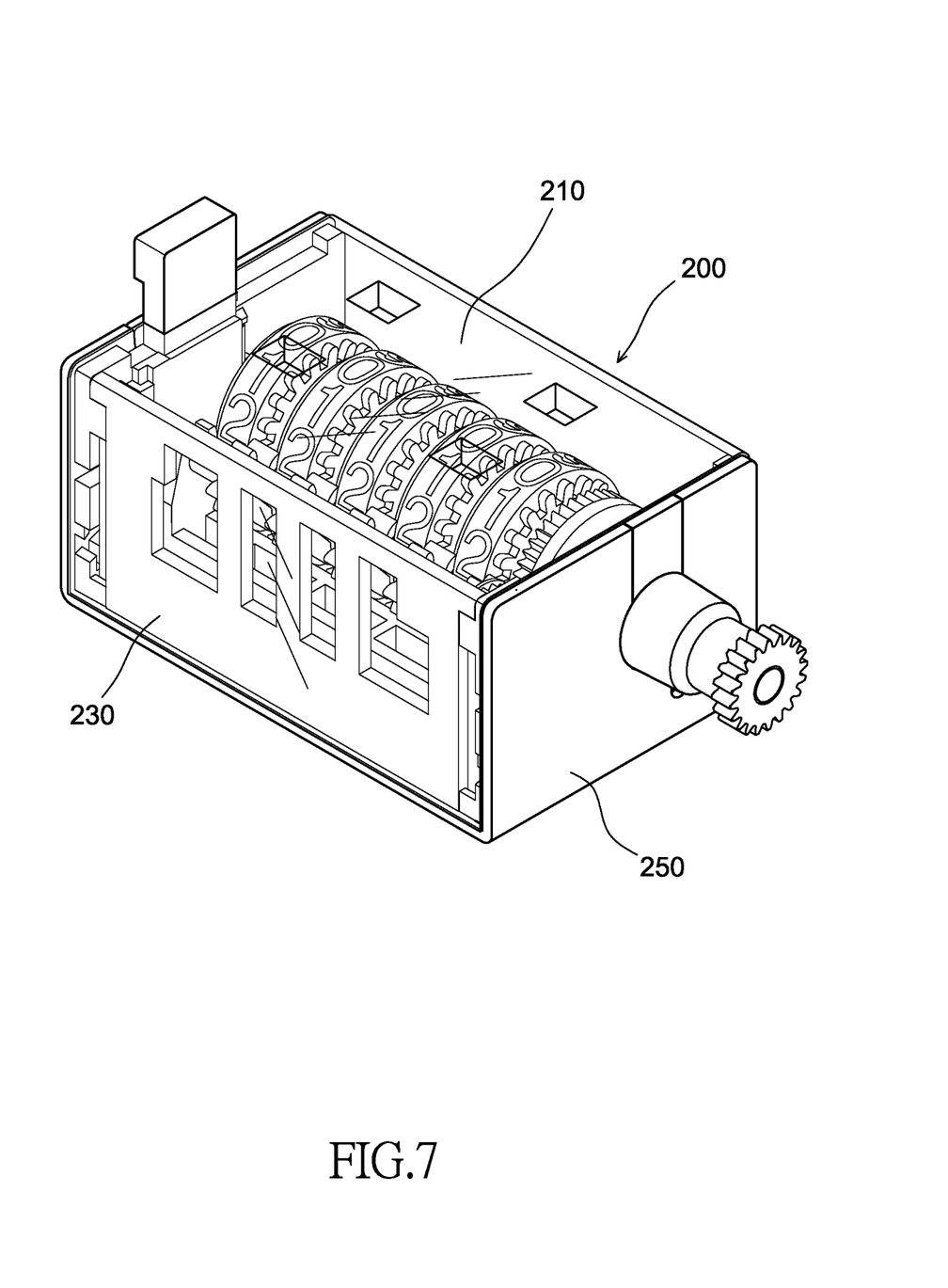
FIG. 7 is a perspective view of the counting device of the present invention while the top surface and the two side surfaces of the housing is transparent.
Figure 8:
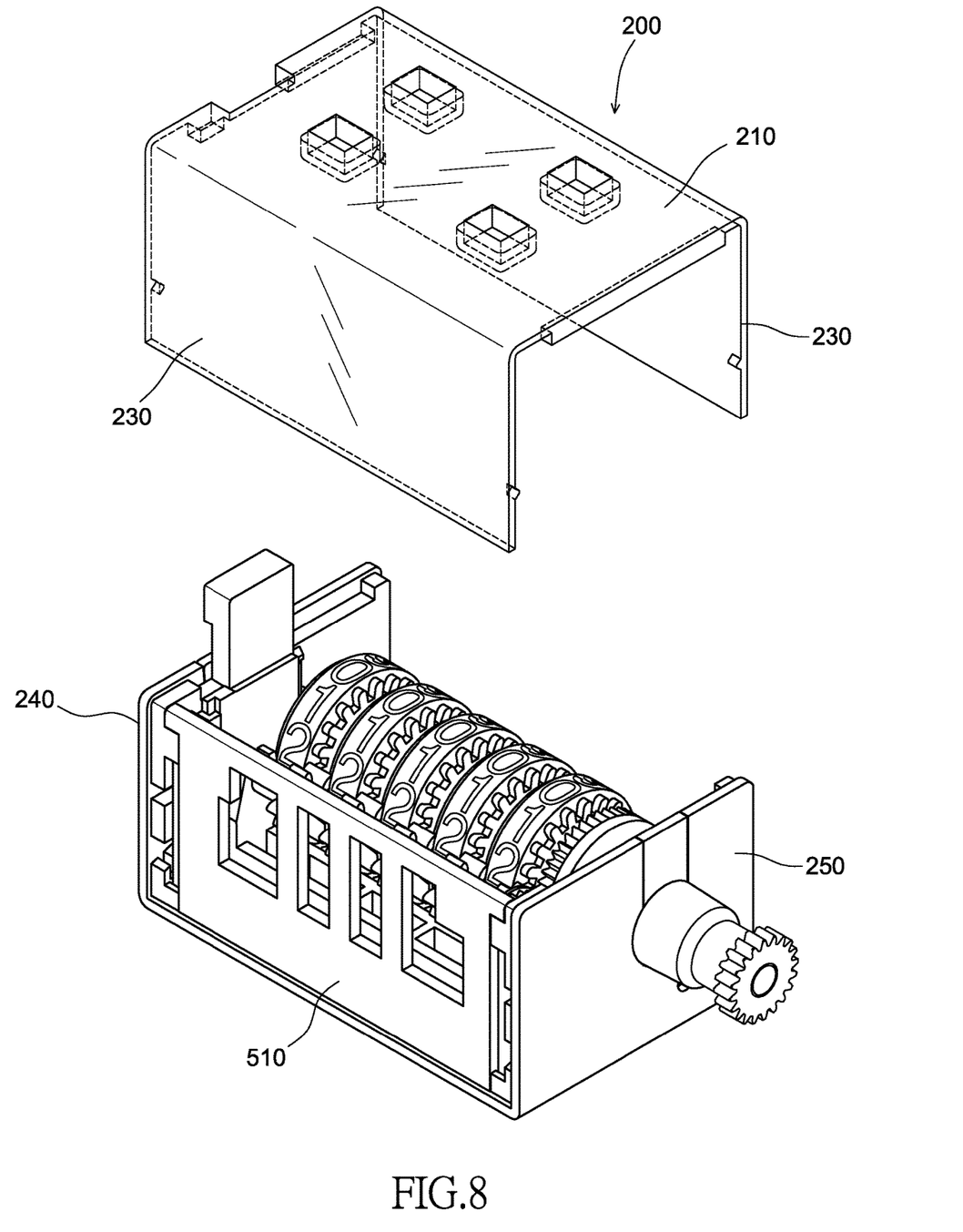
FIG. 8 is a partial exploded view of FIG. 7.

Please refer to FIGS. 7 and 8, the top surface 210 and the two side surfaces 230 of the housing 200 are made of transparent materials. It may be dustproof. It may also easily repair the inside mechanism or clearly see the inside operation while the housing 200 is not disassembled.

According to above mentioned structure and embodiments, there are some advantages for the counting device 100 for distance measuring wheel.

Firstly, the elastic support unit of the reset control assembly is arranged at the side of each of the transmission assembly and the counter wheel assembly so that the size of the counter wheel assembly for displaying may become larger while the size of the housing is not changed. And also, the fatigue problem of the elastic support unit is not easy to be happened.

Secondly, the elastic support unit of the reset control assembly is detachably arranged at the first scarfing slot of the resetting surface and the second scarfing slot of the linking surface so that the elastic support unit after long-term use and fatigue may be replaced.

The foregoing descriptions are merely the exemplified embodiments of the present invention, where the scope of the claim of the present invention is not intended to be limited by the embodiments. Any equivalent embodiments or modifications without departing from the spirit and scope of the present invention are therefore intended to be embraced.

The disclosed structure of the invention has not appeared in the prior art and features efficacy better than the prior structure which is construed to be a novel and creative invention, thereby filing the present application herein subject to the patent law.

What is claimed is:

1. A counting device for distance measuring wheel, comprising:
   a housing, having a top surface, a bottom surface, two side surfaces, a resetting surface, and a linking surface, the top surface has a measuring window, the bottom surface is corresponding to and parallel to the top surface, the two side surfaces are respectively connected to two sides of each of the top surface and the bottom surface, the resetting surface is connected with the top surface, the bottom surface, and the two side surfaces, the resetting surface has a fixing hole, a notch, and a first sliding slot, the notch is arranged toward the top surface, the first sliding slot is arranged toward one of the two side surfaces, the linking surface is opposite to the resetting surface and connected to the top surface, the bottom surface, and the two side surfaces, the linking surface has a through hole and a second sliding slot, the second sliding slot is corresponding to the first sliding slot;
   a transmission assembly, having a first shaft, a driving wheel, a second shaft, and a plurality of transmission wheels, the first shaft is arranged in the through hole of the linking surface and the fixing hole of the resetting surface, one end of the first shaft is protruded from the through hole, the driving wheel is fastened to the first shaft and rotated with the first shaft, the second shaft is elastically reset and slidably arranged in the first sliding slot of the resetting surface and the second sliding slot of the linking surface, the transmission wheels are respectively pivoted on the second shaft, and one of the transmission wheels is engaged with the driving wheel;
   a counter wheel assembly, disposed in the housing and toward the measuring window, the counter wheel assembly has a plurality of counter wheels, the counter wheels are respectively pivoted on the first shaft, and each of the counter wheels is engaged with each of the transmission wheel; and
   a reset control assembly, having an elastic support unit, a push unit, and a dial unit, the elastic support unit is arranged at one of the two side surfaces and supports the second shaft, the push unit is movably arranged at the notch of the resetting surface and abutted against the second shaft, and the dial unit is arranged on the second shaft.

2. The counting device as claimed in claim 1, wherein each of the linking surface and the resetting surface has two long sides and two short sides, the two long sides are respectively connected to the top surface and the bottom surface, and the two short sides are respectively connected to the two side surfaces.

3. The counting device as claimed in claim 1, wherein the resetting surface further includes a first scarfing slot, the linking surface further includes a second scarfing slot, the elastic support unit of the reset control assembly is detachably arranged at the first scarfing slot and the second scarfing slot.

4. The counting device as claimed in claim 1, wherein the push unit has an inclined surface, and the inclined surface pushes the second shaft.

5. The counting device as claimed in claim 1, wherein the top surface and the two side surfaces are made of transparent materials.

* * * * *